(12) United States Patent
Langer et al.

(10) Patent No.: US 8,157,658 B2
(45) Date of Patent: Apr. 17, 2012

(54) DRIVE JOINT AND DRIVE SHAFT

(75) Inventors: Gerald Langer, Buelstringen (DE); Claus Disser, Seligenstadt (DE); Volker Szentmihalyi, Gutach (DE)

(73) Assignee: Shaft-Form-Engineering GmbH, Hausach (DE)

( * ) Notice: Subject to any disclaimer, the term of this patent is extended or adjusted under 35 U.S.C. 154(b) by 0 days.

(21) Appl. No.: 13/187,124

(22) Filed: Jul. 20, 2011

(65) Prior Publication Data

US 2011/0300952 A1    Dec. 8, 2011

Related U.S. Application Data

(63) Continuation of application No. PCT/DE2009/001736, filed on Dec. 8, 2009.

(30) Foreign Application Priority Data

Jan. 20, 2009    (DE) .......................... 10 2009 005 544

(51) Int. Cl.
*F16D 3/223*    (2011.01)

(52) U.S. Cl. ...................................... 464/145; 464/906

(58) Field of Classification Search .................. 464/140, 464/145, 906, 32; 280/777; 403/2
See application file for complete search history.

(56) References Cited

U.S. PATENT DOCUMENTS

| | | | |
|---|---|---|---|
| 2,361,629 A * | 10/1944 | Irvin | |
| 6,280,340 B1 * | 8/2001 | Masuda | 464/906 |
| 6,379,255 B1 | 4/2002 | Cermak et al. | |
| 7,121,947 B2 * | 10/2006 | Ueda et al. | |
| 7,674,183 B2 | 3/2010 | Lutz et al. | |
| 2005/0197192 A1 * | 9/2005 | Komai | |
| 2007/0026954 A1 | 2/2007 | Langer et al. | |
| 2007/0123356 A1 * | 5/2007 | Lutz et al. | 464/145 |

FOREIGN PATENT DOCUMENTS

| | | |
|---|---|---|
| DE | 199 43 880 C1 | 6/2001 |
| WO | WO 03/074893 A1 | 9/2003 |
| WO | WO 2005/056327 A2 | 6/2005 |

* cited by examiner

*Primary Examiner* — Gregory Binda
(74) *Attorney, Agent, or Firm* — Crowell & Moring LLP

(57) ABSTRACT

A drive joint, particularly a fixed joint in the form of a counter-track joint, for establishing a connection between two components in the drive train of a motor vehicle. The joint is provided with joint parts such as an inner hub, an outer hub and a ball cage containing torque-transmitting balls as additional joint parts. The outer hub of the drive joint can be destroyed in the case of an accident. The invention also relates to a drive shaft comprising such a drive joint.

9 Claims, 2 Drawing Sheets

DRIVE JOINT AND DRIVE SHAFT

CROSS REFERENCE TO RELATED APPLICATIONS

This application is a continuation of international patent application no. PCT/DE2009/001736, filed Dec. 8, 2009, designating the United States of America and published in German on Jul. 29, 2010 as WO 2010/083793, the entire disclosure of which is incorporated herein by reference. Priority is claimed based on Federal Republic of Germany patent application no. DE 10 2009 005 544.4, filed Jan. 20, 2009, the contents of which are likewise incorporated herein by reference.

BACKGROUND OF THE INVENTION

The invention relates to a drive joint for establishing a connection that is rotationally and axially fixed, and nevertheless allows a limited angular movement between two components, particularly in the drive train of a motor vehicle, which drive joint comprises an inner hub as the inner joint part, an outer hub as the outer joint part as well as torque-transmitting members as additional joint parts that are provided between the inner and outer joint parts. Furthermore, the invention relates to a drive shaft comprising at least one drive joint of such type.

A drive joint of such type is disclosed in U.S. Pat. No. 7,674,183 (=WO 2005/056327). In this drive joint, the inner hub and/or the outer hub are deformed in such a way when a defined axial force acting upon the joint is exceeded that the inner hub can disengage from the outer hub. This solution has proved particularly advantageous. However, it is necessary for this purpose to adapt the material properties of the inner hub and/or the outer hub to each other in such a way that in the case of a defined axial force such as that occurring during a head-on collision, the joint parts can disengage from each other so that the shaft parts connected to the joint can telescope into each other. In some special applications, such a design of the joint parts can prove disadvantageous.

Furthermore, U.S. Pat. No. 6,379,255 (=DE 199 43 880) discloses a drive joint of a drive shaft, in which the cage of the drive joint is in the form of a predetermined breaking point. If a high axial force acts upon the drive shaft during an accident, the cage and thus the drive joint is destroyed. The inner hub can then move relative to the outer hub. This solution also results in an axial shortening of the drive arrangement, which is desirable in the case of a head-on collision and which avoids the drive arrangement from buckling to one side and also avoids any rotating components thereof from entering the vehicle interior. However, the destruction of the cage leads to fragments that, in the worst case, can likewise enter the vehicle interior and injure passengers, and more particularly lock the drive joint and the drive shaft, thereby resulting in additional states of the drive shaft that put the vehicle occupants at risk.

SUMMARY OF THE INVENTION

By contrast, it is an object of the present invention to provide a drive joint of the aforementioned type that provides a very high level of safety to the vehicle occupants in case of an accident, more particularly, a head-on collision.

According to the invention, this object is achieved substantially in that the drive joint is configured in such a way that the outer hub breaks open at least at one location, when a defined axial force acting upon the drive joint is exceeded, in such a way that a crack extending at least approximately in the radial direction is formed in the outer hub, which crack enables the inner hub to disengage from the outer hub. The crack that forms in the outer hub, for example, during a head-on collision need not extend in a radial plane that is exactly parallel to the axis of rotation of the outer hub; but instead, the crack can have an irregular and/or jagged fracture pattern. The outer hub is preferably designed in such a way that it breaks away completely at only one location and, at the most, expands and/or cracks at other locations. Thus the outer hub continues to exist as a component so that the risk of fragments flying around and/or locking the drive train is avoided. The disengagement of the joint parts enables the components such as sections of a drive shaft that are connected to the joint to telescope into each other. This considerably prevents the risk involved when such a shaft buckles.

In a development of this idea of the invention, at least the outer hub is received in a carrier housing, which encompasses the same, at least partially, and which is configured in such a way that it expands when the inner hub disengages from the outer hub. In other words, the carrier housing additionally ensures that the outer hub does not break into a plurality of small fragments or that it holds these fragments together in such a way that they cannot lock the drive train and put the vehicle occupants at risk. It is particularly preferred if the carrier housing only undergoes elastic or plastic deformation, but at least does not break when the inner hub disengages from the outer hub.

Apart from the selection of a suitable material for the joint parts, it has proven advantageous for the aforementioned property of the drive joint if the outer hub comprises at least one predetermined breaking point. Such a predetermined breaking point can be formed by a profiling of the outer hub that serves for the transmission of torque and/or at least one notch in the outer hub. Preferably, a plurality of balls, which are received in raceways of the outer hub and the inner hub and are optionally guided in a cage are provided for the transmission of torque between the inner hub and the outer hub. These raceways usually constitute locations in the outer hub that have smaller cross-sections so that predetermined breaking points are formed. Furthermore, the outer hub can comprise a profiling for the transmission of torque to the carrier housing, which profiling comprises indentations and/or projections and which likewise forms regions serving as weak portions and predetermined breaking points. When the drive joint is in the form of a counter-track joint comprising cage-centering surfaces disposed on both sides of the raceways, notches that can likewise serve as predetermined breaking points can be provided on the inner side of the outer hub between the mutually opposing cage-centering surfaces, that is, approximately centrally between the raceways. Such notches can also be provided in the bases of the raceways for the balls.

It is particularly preferred if the outer hub is configured in such a way that it expands in addition to forming the at least one crack, when a defined axial force acting upon the drive joint is exceeded, in such a way that the inner hub together with the torque-transmitting members can disengage from the outer hub. This makes it possible for the drive joint as well as components of the drive train that are optionally connected thereto to telescope into each other, as a result of which the drive shaft is prevented from buckling and putting the vehicle occupants at risk during an accident.

In order to prevent the drive joint and the drive train from being locked during an accident, it is particularly preferred if the joint is configured in such a way that the inner hub and/or the torque-transmitting members disengage from the outer hub non-destructively. The term "non-destructively" used in this context shall be understood to mean a disengagement of both the inner hub and the torque-transmitting members, after which they are in an undamaged state that corresponds approximately to the operating state. However, the term "non-destructively" used in this context does not exclude small plastic deformations of the inner hub and/or the torque-transmitting members.

If the deformation of the outer hub and optionally the carrier housing caused when a defined axial force acting upon the drive joint is exceeded during an accident is substantially elastic in nature, the at least one crack in the outer hub can close again after the inner hub has disengaged from the outer hub. Thus the outer hub remains approximately intact even after its breakage and can additionally stabilize the telescoping components of the drive train.

According to a preferred embodiment, the outer hub is designed in such a way that it breaks open in the case of an axial force ranging between approximately 7 KN and approximately 60 KN. Very preferably, the defined breakdown of the outer hub as suggested by the invention takes place at an axial force of approximately 10 KN to approximately 40 KN.

The idea underlying the invention can be realized particularly in a fixed joint that is in the form of a counter-track joint. Such a counter-track joint comprises first and second raceways, which are distributed in an alternating manner both in the inner and the outer hub around the circumference thereof, and the bases of which approach the axis of rotation of the drive joint in variable axial directions. First raceways of the inner hub are assigned to first raceways of the outer hub in such a way that they open out into the same direction. Exactly one ball that transmits torque between the inner hub and the outer hub is received in each of the raceway pairs. The balls can be guided in a cage disposed between the inner hub and the outer hub.

The invention further relates to a drive shaft comprising at least one drive joint of the type described above. The drive shaft can be a longitudinal shaft for motor vehicles that is composed of two tubular shaft parts, for example. The drive joint of the invention can be provided as a central articulation for establishing a connection between two shaft parts so that the two shaft parts can telescope into each other following a destruction of the drive joint in an accident. For this purpose, the two tubular shaft parts preferably have different diameters.

BRIEF DESCRIPTION OF THE DRAWINGS

The invention will be described in further detail hereinafter with reference to illustrative embodiments depicted in the accompanying drawing figures in which.

DETAILED DESCRIPTION OF ILLUSTRATIVE EMBODIMENTS

Figure 1:
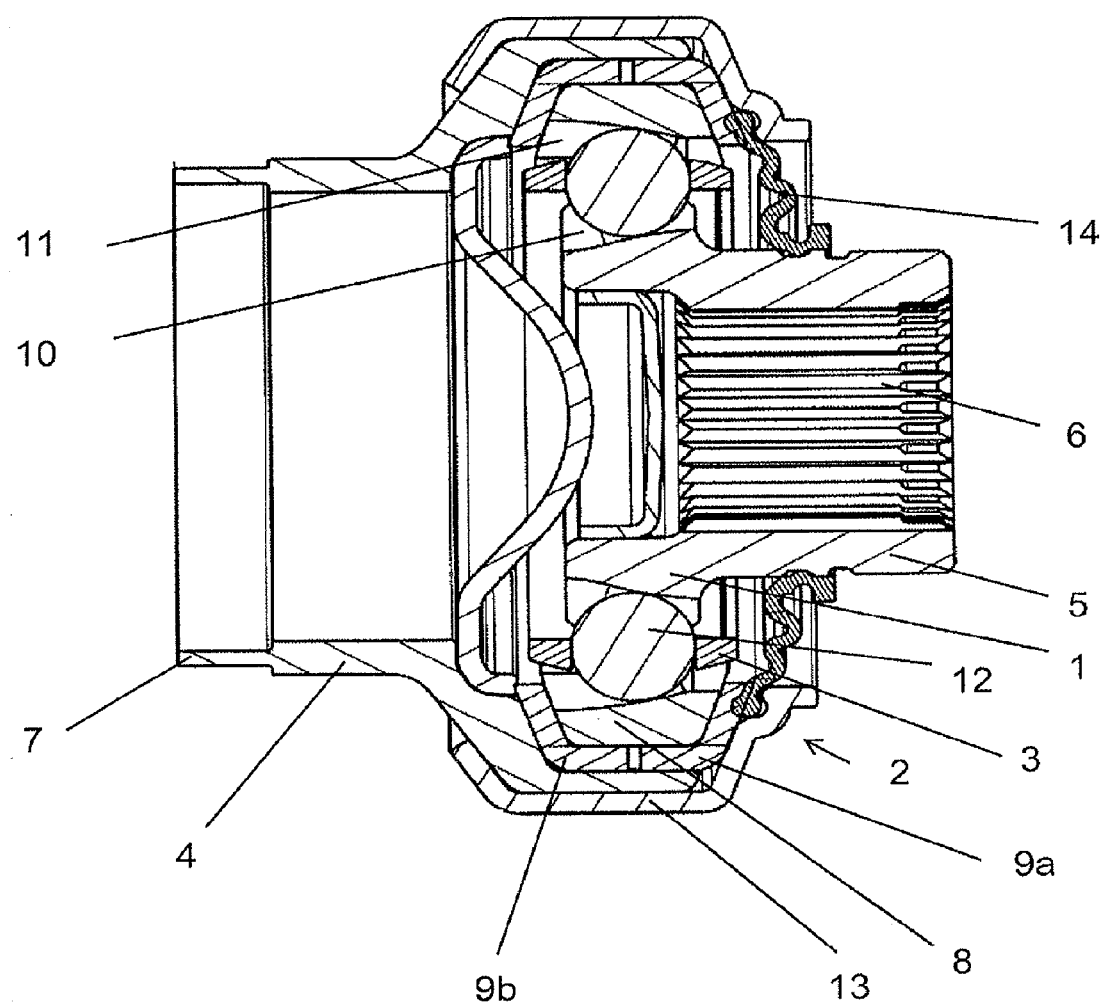
FIG. 1 is a sectional view of a drive joint according to the present invention.

The drive joint shown in FIG. 1 comprises an inner hub 1, an outer hub 2, a cage 3 guided between the inner hub 1 and the outer hub 2 as well as a carrier housing 4. The inner hub 1 and the carrier housing 4 are each configured for connection to a driving component or a component that is to be driven. Thus the inner hub 1 is equipped with a sleeve-like section 5 that is provided with teeth 6 for the rotationally fixed connection of a shaft journal or the like, and the carrier housing 4 is provided with a connecting region 7 via which a hollow shaft (not shown in the figure) can be welded to the carrier housing 4.

The inside diameter of the connecting region 7 of the carrier housing 4 is not smaller than the outside diameter of the inner hub 1. Thus the inner hub 1 together with a component connected thereto can telescope into the connecting region 7 of the carrier housing 4 in the case of damage caused to the drive joint.

In the embodiments shown, the outer hub 2 comprises a ring-like inner element 8 as well as an absorber that comprises two molded parts 9a, 9b and that is made of an elastically deformable material such as plastic. In other embodiments, it is also possible to dispense with this absorber without replacement. The two molded parts 9a, 9b of the absorber encompass the inner element 8 from the outside and at the front sides. The inner element 8 and the absorber each comprise profiling for the purpose of transmitting torque, and the internal contour of the carrier housing 4 that encompasses the absorber including the inner element 8 is provided with corresponding profiling.

Figure 2:
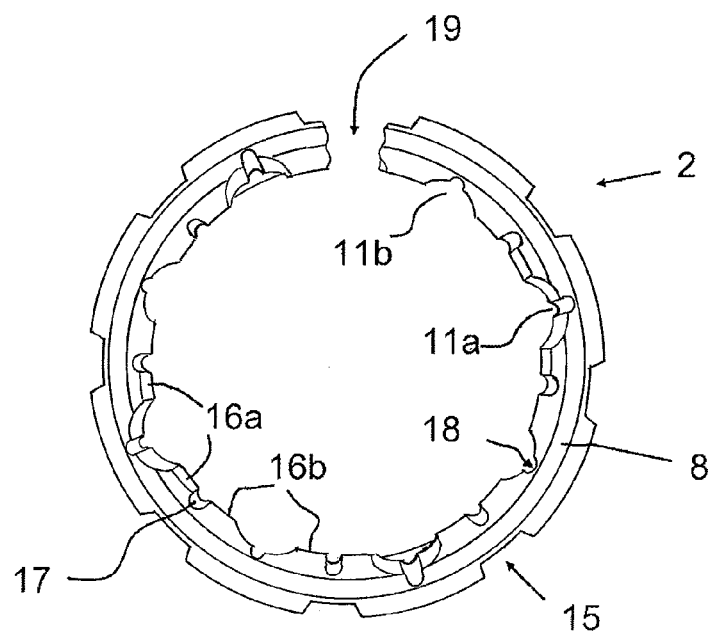
FIG. 2 is a schematic view of the outer hub of the drive joint of in FIG. 1, when a defined axial force acting upon the drive joint is exceeded.

First and second inner raceways 10 are provided on the inner hub 1, and first and second outer raceways 11a, 11b are provided on the inner element 8 of the outer hub 2. The first and the second raceways of both the hubs are associated with one another in pairs. As shown in FIG. 2, these first and second raceway pairs are distributed alternately around the circumference of the drive joint. In the embodiments shown, there are eight raceway pairs provided in a drive joint so that first inner raceway pairs are located opposite to first outer raceway pairs and accordingly, second inner raceway pairs are located opposite to second outer raceway pairs. Therefore, only first raceway pairs are visible in the view shown in FIG. 1.

The raceway pairs differ from each other in that the bases of the first raceways shown in FIG. 1 are disposed at a distance from each other in a direction extending from left to right; i.e., the first raceway pairs open towards the sleeve-like section 5. By contrast, the bases of the second raceway pairs are disposed at a distance from each other in the opposite direction; i.e., the second raceway pairs open towards the connecting region 7. The ball joint shown in FIG. 1 is thus a counter-track joint, that is, a fixed joint that permits the inner hub 1 to bend relative to the outer hub 2, but does not allow an axial displacement of these two components relative to each other. A ball 12 is received in each of the raceway pairs for the purpose of transmitting torque. The balls are retained in the cage 3.

Furthermore, the joints shown in the figures are each equipped with bellows 14 that seal the joint between the inner hub 1 and the outer hub 2 on the side of the sleeve-like section 5. On the opposite side of the joint, there is a cover provided that is received in the carrier housing 4.

The joint shown in FIG. 1 further has a cap 13 that encompasses the carrier housing 4. This cap 13 serves as a retaining element for securing together the carrier housing 4, the two molded parts 9a, 9b of the absorber, the inner element 8 as well as the bellows 14.

The outer hub 2 shown in FIG. 2 or the inner element 8 thereof comprises indentations 15 on its outer circumference, which indentations 15 serve the purpose of transmitting torque and engage with a corresponding profiling of the absorber (if present) or the carrier housing 4. Furthermore, first and second cage-guiding surfaces 16a, 16b are provided between the raceways 11a and 11b on the inner side of the outer hub 2. In the embodiment shown, notches 17 and 18 are provided both between the cage-centering surfaces 16*a*, 16*b* and in the bases of the raceways 11*a*, 11*b*, which notches together with the portions of the outer hub having reduced wall thickness due to the indentations 15 and the raceways form predetermined breaking points of the inner element 8 of the outer hub 2.

As shown in FIG. 2, the outer hub 2 is made to break at a location in a defined form when an axial force of approximately 10 KN to approximately 40 KN acts upon the drive joint. This results in an approximately radially extending crack 19 in the outer hub. The carrier housing (not shown in FIG. 2) holds the outer hub in its position so that the inner hub can slide through the outer hub. In doing so, the inner hub, the cage and/or the balls do not get destroyed nor does the entire joint get locked. The crack 19 occurs at the point in time (shown in FIG. 2) at which maximum force acts upon the joint, and the crack opens up only for a short period of time. After the inner hub has slid through the outer hub, the outer hub is joined together again so that the crack 19 closes again, at least in part.

The foregoing description and examples have been set forth merely to illustrate the invention and are not intended to be limiting. Since modifications of the described embodiments incorporating the spirit and substance of the invention may occur to person skilled in the art, the invention should be construed broadly to include all variations within the scope of the appended claims and equivalents thereof.

The invention claimed is:

1. A drive joint for establishing a connection that is rotationally and axially fixed, but still allows a limited angular movement between two components, said drive joint comprising:
    an inner hub as an inner joint part;
    an outer hub as an outer joint part, the outer hub having at least one predetermined breaking point; and
    a plurality of torque-transmitting members as additional joint parts provided between the inner and outer joint parts,
    wherein said joint is configured such that
        the outer hub breaks open at only one location and only expands and/or cracks without breaking open at other locations when a defined axial force acting upon the drive joint is exceeded, such that the inner hub is able to disengage from the outer hub,
        the inner hub disengages from the outer hub non-destructively, and
        the outer hub closes after the inner hub has disengaged from the outer hub.

2. The drive joint as recited in claim 1, wherein the at least one predetermined breaking point is formed by a profiling that serves to transmit torque.

3. The drive joint as recited in claim 1, wherein the at least one predetermined breaking point is formed by at least one notch in the outer hub.

4. The drive joint as recited in claim 1, wherein the outer hub is configured in such a way that, when a defined axial force acting upon the drive joint is exceeded, the outer hub, in addition to forming at least one crack, expands in such a way that the inner hub together with the torque-transmitting members can disengage from the outer hub.

5. The drive joint as recited in claim 1, wherein the joint is configured in such a way that the torque-transmitting members disengage from the outer hub non-destructively.

6. The drive joint as recited in claim 1, wherein the joint is configured in such a way that the inner hub and the torque-transmitting members disengage from the outer hub non-destructively.

7. The drive joint as defined in claim 1, wherein the outer hub breaks open upon being subjected to an axial force ranging between about 7 KN and about 60 KN.

8. The drive joint as recited in claim 1, wherein said drive joint is in the form of a fixed joint.

9. The drive joint as recited in claim 8, wherein said drive joint is a counter-track joint.

\* \* \* \* \*